US012293856B2

(12) United States Patent
Sue et al.

(10) Patent No.: US 12,293,856 B2
(45) Date of Patent: May 6, 2025

(54) COPPER NANOWIRES AND THEIR USE IN PLASTICS TO IMPROVE THERMAL AND ELECTRICAL CONDUCTIVITY

(71) Applicants: The Texas A&M University System, Bryan, TX (US); FORMOSA PLASTICS CORPORATION, Kaohsiung (TW)

(72) Inventors: Hung-Jue Sue, College Station, TX (US); Chia-Ying Tsai, College Station, TX (US); Kwang-Ming Chen, Kaohsiung (TW); Kun-Pei Hsieh, Kaohsiung (TW); Chao-Shun Chang, Kaohsiung (TW); Ssu-Ping Huang, Kaohsiung (TW)

(73) Assignees: THE TEXAS A&M UNIVERSITY SYSTEM, Bryan, TX (US); FORMOSA PLASTICS CORPORATION, Kaohsiung (TW)

( * ) Notice: Subject to any disclaimer, the term of this patent is extended or adjusted under 35 U.S.C. 154(b) by 11 days.

(21) Appl. No.: 17/348,418

(22) Filed: Jun. 15, 2021

(65) Prior Publication Data
US 2021/0388180 A1 Dec. 16, 2021

Related U.S. Application Data

(60) Provisional application No. 63/039,301, filed on Jun. 15, 2020.

(51) Int. Cl.
| | | |
|---|---|---|
| *H01B 1/22* | (2006.01) | |
| *B22F 1/054* | (2022.01) | |
| *B22F 1/07* | (2022.01) | |
| *B22F 1/102* | (2022.01) | |
| *B22F 9/24* | (2006.01) | |
| *C08J 3/20* | (2006.01) | |
| *C08J 3/205* | (2006.01) | |
| *C08J 3/215* | (2006.01) | |
| *C08K 3/08* | (2006.01) | |
| *C08K 7/06* | (2006.01) | |
| *C08K 9/04* | (2006.01) | |
| *C09K 5/14* | (2006.01) | |
| *B22F 1/107* | (2022.01) | |

(52) U.S. Cl.
CPC ............ *H01B 1/22* (2013.01); *B22F 1/0547* (2022.01); *B22F 1/07* (2022.01); *B22F 1/102* (2022.01); *B22F 9/24* (2013.01); *C08J 3/201* (2013.01); *C08J 3/2053* (2013.01); *C08J 3/215* (2013.01); *C08K 3/08* (2013.01); *C08K 7/06* (2013.01); *C08K 9/04* (2013.01); *C09K 5/14* (2013.01); *B22F 1/107* (2022.01); *B22F 2301/10* (2013.01); *B22F 2304/054* (2013.01); *C08K 2003/085* (2013.01); *C08K 2201/001* (2013.01); *C08K 2201/011* (2013.01); *C08K 2201/016* (2013.01)

(58) Field of Classification Search
CPC ... H01B 1/02; H01B 1/22; H01B 1/20; H01K 1/092; H01K 1/095; H01K 1/097; C09D 5/24; C09D 7/20; C09D 7/43; C09D 7/44; C09D 7/65; C09D 7/67; C09D 7/68; C09D 11/52; B82Y 40/00; C09K 5/14; B22F 1/05; B22F 1/0547; B22F 1/056; B22F 1/062; B22F 1/07; B22F 1/08; B22F 1/10; B22F 1/102; B22F 1/145; B22F 1/147; B22F 9/16; B22F 9/18; B22F 9/20; B22F 9/24; B22F 2301/10; B22F 2304/054; B22F 2304/056; C08J 3/201; C08J 3/2053; C08J 3/215; C08K 1/08; C08K 7/06; C08K 9/04; C08K 2003/085; C08K 2201/001; C08K 2201/011; C08K 2201/016

See application file for complete search history.

(56) References Cited

U.S. PATENT DOCUMENTS

| | | | | |
|---|---|---|---|---|
| 8,723,153 B2* | 5/2014 | Kosowsky | ........ | H01L 21/02118 257/3 |
| 9,761,349 B2* | 9/2017 | Imahashi | ................. | H01B 1/22 |
| 2008/0206488 A1* | 8/2008 | Chung | .................. | C09D 11/52 252/514 |

(Continued)

FOREIGN PATENT DOCUMENTS

| | | | |
|---|---|---|---|
| CN | 1727523 A | * | 2/2006 |
| CN | 104867540 A | | 8/2015 |

(Continued)

OTHER PUBLICATIONS

Jin et al. ("Shape-controlled synthesis of copper nanocrystals in an aqueous solution with glucose as a reducing agent and hexadecylamine as a capping agent," Angew. Chem. Int. Ed., 2011, 50, 10560-10564) (Year: 2011).*
Zhang et al. ("Synthesis of ultralong copper nanowires for high-performance transparent electrodes," J. Am. Chem. Soc., 2012, 145, 14283-14286) (Year: 2012).*
Yi et al. ("Expeditious and highly efficient synthesis of propargylamines using a Pd—Cu nanowires catalyst under solvent-free conditions," App. Organometal Chem., 2019, 33, e4917) (Year: 2019).*
Chang et al. ("Synthesis of CuInSe2 ternary nanostructures: a combined oriented attachment of ligand protection strategy," CrystEngComm, 2011, 13, 4236) (Year: 2011).*

(Continued)

*Primary Examiner* — Matthew R Diaz
(74) *Attorney, Agent, or Firm* — MUNCY, GEISSLER, OLDS & LOWE, P.C.

(57) ABSTRACT

The present disclosure provides a copper nanowire composition. The copper nanowire composition includes copper nanowire having associated ligands with the structure $HNR^1R^2$, where $R^1$ is hydrogen, alkyl group, or arylalkyl group, $R^2$ is alkyl group or arylalkyl group, wherein the associated ligand has an amount of 100 wt % to 10000 wt % versus a weight of the copper nanowire.

15 Claims, No Drawings

(56) References Cited

U.S. PATENT DOCUMENTS

| | | | | |
|---|---|---|---|---|
| 2008/0260995 | A1* | 10/2008 | Hirakoso | C09D 11/52 |
| | | | | 106/1.23 |
| 2010/0189901 | A1* | 7/2010 | Chung | C09D 11/52 |
| | | | | 427/591 |
| 2013/0008690 | A1* | 1/2013 | Wiley | B22F 1/0545 |
| | | | | 428/401 |
| 2013/0230717 | A1* | 9/2013 | Xia | B22F 1/0547 |
| | | | | 428/397 |
| 2014/0205853 | A1* | 7/2014 | Funakubo | C09D 11/037 |
| | | | | 428/605 |
| 2015/0359105 | A1* | 12/2015 | Yoon | C09D 129/04 |
| | | | | 174/268 |
| 2016/0293290 | A1* | 10/2016 | Mizusaki | H01B 1/24 |

FOREIGN PATENT DOCUMENTS

| | | | | |
|---|---|---|---|---|
| CN | 106782768 | A | | 5/2017 |
| CN | 108376587 | A | | 8/2018 |
| CN | 110434353 | A | | 11/2019 |
| CN | 110760116 | A | | 2/2020 |
| JP | 2015032403 | A | * | 2/2015 |
| TW | 201639777 | A | | 11/2016 |
| WO | WO-2013137018 | A1 | * | 9/2013 ............ B22F 1/0025 |

OTHER PUBLICATIONS

Lu et al. ("Selective synthesis of secondary amines from nitriles using PT nanowires as a catalyst", Chem. Commun., 2014, 50, 2512) (Year: 2014).*

Letian Dou et al., "Solution-Processed Copper/Reduced-Graphene-Oxide Core/Shell Nanowire Transparent Conductors," ACSNANO, DOI:10.1021/acsnano.5b07651, Accepted: Jan. 25, 2016, Published: Jan. 28, 2016, 2600-2606.

Revathy Ravindren et al., "Prediction of electrical conductivity, double percolation limit and electromagnetic interference shielding effectiveness of copper nanowire filled flexible polymer blend nanocomposites," Composites Part B, 164, 2019, 559-569.

Bowen Zhang et al., "Large-Scale and Galvanic Replacement Free Synthesis of Cu@Ag Core-Shell Nanowires for Flexible Electronics," Inorg. Chem., 58, 2019, 3374-3381.

Bo Li et al., "Properties and effect of preparation method of thermally conductive polypropylene/aluminum oxide composite," J Mater Sci , 52, 2017, 2524-2533.

Liang Xu et al., "Comparison Study on the Stability of Copper Nanowires and Their Oxidation Kinetics in Gas and Liquid, American Chemical Society," ACSNANO, DOI:10.1021/acsnano.6b00704, Accepted: Mar. 2, 2016, 12 pages.

Yannan Li et al., "Biodegradable thermal imaging-tracked ultralong nanowire-reinforced conductive nanocomposites elastomers with intrinsical efficient antibacterial and anticancer activity for enhanced biomedical application potential," Biomaterials, 2019, 201, 68-76.

Guimin Zhang et al., "Stable Pd@Cu Core-Shell Nanocubes with Finely Tuned Sizes for the Reduction of Nitroaromatics," ACS Appl. Nano Mater, 2019, 2, 4584-4593.

* cited by examiner

COPPER NANOWIRES AND THEIR USE IN PLASTICS TO IMPROVE THERMAL AND ELECTRICAL CONDUCTIVITY

CROSS-REFERENCE TO RELATED APPLICATION

The application claims priority to U.S. Provisional Application Ser. No. 63/039,301, filed on Jun. 15, 2020, which is herein incorporated by reference in its entirety.

BACKGROUND

Field of Invention

The present invention relates to copper nanowires decorated with alkyl ligands and their use in plastic compositions to improve their thermal and electrical conductivity.

Description of Related Art

Plastics are known to be poor thermal conductors. In many applications this is desirable, for example in drinking cups to insulate hot or cold beverages. In other applications, such as cases and packaging for electronic devices, increased heat conductivity would be desirable to dissipate heat. Conventional fillers such as alumina are useful for this purpose, but the amounts necessary to make significant improvements are so large that the mechanical properties of the plastic are altered and, because of increased melt viscosities, can be difficult to mold and process. For example, polypropylene requires 20 vol % (47 wt %) of aluminum oxide to increase the thermal conductivity from 0.21 to 0.50 W/(m·° K) (Li, B.; Li, R.; Xie, Y., *Journal of Materials Science* 2017, 52, (5), 2524-2533).

Copper nanowires (CuNWs) (less than 100 nm diameter) are ideal fillers because the thermal conductivity of copper is exceptionally high (400 W/(m·° K)) and the high aspect ratio (>10) allows the effectiveness per amount added to be relatively high. However, two problems must be overcome for copper nanowires to be effective. First, copper oxidizes rapidly on the surface, reducing the thermal conductivity. This is a significant problem for nanowires because the surface area per unit weight is extremely high. A second problem is that nanomaterials have a strong tendency to aggregate. This lowers the aspect ratio and reduces the effectiveness of the filler.

Copper nanowires have been stabilized by alcohols (Xu L., Yang Y., Hu Z W., Yu S. H. *ACS Nano* 2016 (10) 3823-3834). However, this treatment is not suitable for preventing aggregation on mixing with plastics. CuNWs have excellent electrical and thermal conductivities. However, they prone to oxidation in ambient environments, and are not stable during solution processing (organic or aqueous solution), which compromises their intended industrial applications. Currently, CuNWs are only able to be embedded in amorphous polymer (polystyrene, *Biomaterials* 2019 (201) 68-76) or co-polymer matrix (poly(ethylene-co-methyl acrylate), *Compos. B* 2019 (164) 559-569) through a low-temperature solution mixing. The current oxidation-resistant strategies for CuNWs are decorating CuNWs with silver (Inorg. Chem. 2019 (58) 3374-3381), palladium (*ACS Appl. Nano Mater.* 2019 (2) 4584-4593) or graphene oxide (*ACS Nano* 2016 (10) 2600-2606). These decorations are much more expensive in comparison with copper and cannot be replaced.

Plastics are used in many applications including electronic devices, transportation, medical, and household items. In electronic devices, the need for dissipation or redistribution of heat is common. There are number of ways to design such devices, including aluminum cases or heat sinks as well as fans. The use of a filled plastic would be a low-cost alternative. In modern automotive vehicles, the use of plastics "under the hood" is increasingly common for components, such as intake manifolds, radiators, piping, and ventilation. These applications would benefit from plastics with improved heat conductivity.

Aluminum and other metals are often used where heat transfer is important. Metals are generally more costly to fabricate than plastics. There are also other fillers for plastics that can offer improved heat conductivity. Alumina is often used because it has relatively high thermal conductivity, as high as 38 W/(m·° K). However, because it has a low aspect ratio, the amounts necessary for significant improvements are substantial as mentioned above. High loadings of fillers greatly increase the melt viscosity and consequently the difficult in fabrication. In addition, alumina can be abrasive to mixing and molding equipment.

Despite the attractiveness of the use of copper nanowires as a filler for plastic compositions, a need exists for copper nanowires compositions that overcome the deficiencies noted above. The present invention seeks to fulfill this need and provides further related advantages.

SUMMARY

In one aspect of the invention, copper nanowire (CuNVV) compositions are provided. In one embodiment, the composition comprises a copper nanowire having associated alkylamine ligands.

In certain embodiments, the copper nanowire has an aspect ratio of at least 10.

In certain embodiments, the associated ligand contains at least 12 carbon atoms (e.g., $HNR^1R^2$ where $R^1$ and $R^2$ are hydrocarbon groups containing a total of at least 12 carbons).

In certain embodiments, $R^1$ is selected from the group consisting of hydrogen, methyl, ethyl, n-propyl, i-propyl, butyl, n-butyl, sec-butyl, t-butyl, n-hexyl, cyclohexyl, n-octyl, n-decyl, n-hexadecyl, and n-octadecyl, and $R^2$ is selected from the group consisting of methyl, ethyl, n-propyl, i-propyl, n-butyl, sec-butyl, t-butyl, n-hexyl, cyclohexyl, n-octyl, n-decyl, n-hexadecyl, and n-octadecyl.

In certain embodiments, $R^1$ and $R^2$ are independently an aryl- or alkaryl groups. Representative aryl groups are benzene, naphthalene, anthracene, and related aryl radicals. Representative alkaryl groups include benzyl (—$CH_2Ph$), 2-phenyl-1-ethyl (—$CH_2CH_2Ph$), and 1-phenyl-1-ethyl (—$CH_2CH$-Ph-) groups.

For oxidation resistance (aqueous), in certain embodiments, the alkylamine includes 12-18 carbons. For electrical conductivity, in certain embodiments, the alkylamine includes 14 or fewer carbons.

The CuNW composition is prepared by binding an amine to the copper nanowire. Representative aliphatic amines include primary (e.g., $R^1NH_2$, wherein $R^1$ is a C12-C18 straight chain or branched alkyl) and secondary amines (e.g., $(R^1)(R^2)NH$, wherein $R^1$ and $R^2$ are independently C1-C18 straight chain or branched alkyl).

In certain embodiments, the composition is prepared using excess alkylamine.

In one embodiment, a representative process to prepare alkylamine ligand protected CuNW is given.

In another embodiment, a representative process to protect CuNW from oxidation during solution mixing via excess alkyalmine is described.

In another aspect, the invention provides plastic copper nanowire (CuNW) compositions. In certain embodiments, the composition comprises a plastic and either (a) a copper nanowire composition comprising a copper nanowire having associated alkylamine ligands or (b) a copper nanowire composition comprising a copper nanowire having associated alkylthiol ligands.

In certain embodiments, the copper nanowire composition is dispersed uniformly throughout the plastic.

In certain embodiments, the associated alkylamine includes an alkyl group having from 6 to 18 carbons atoms. For oxidation resistance (aqueous), the alkylamines have from 12 to 18 carbon atoms, and for electrical conductivity, the alkylamines have 14 or fewer carbons atoms.

In certain embodiments, the associated alkylthiol includes an alkyl group having from 6 to 18 carbons atoms. For oxidation resistance (aqueous), the alkylthiols have 12 to 18 carbon atoms, and or electrical conductivity, the alkylthiols have 14 or fewer carbon atoms.

In certain embodiments, the plastic is a thermoplastic. In other embodiments, the plastic is a thermoset.

In certain embodiments, the plastic is a polyolefin.

Representative plastics include polyethylene variants (e.g., high density, low density, linear low density), polypropylenes, copolymers of ethylene with propylene or vinyl acetate, ABSs (i.e., terpolymer of acrylonitrile, butadiene, styrene), polystyrenes, polyvinylchlorides, polyesters (e.g., poly(ethylene terephthalate)), polycarbonates (e.g., bisphenol A polycarbonate), nylons, and polyurethanes. In certain embodiments, the plastic is a polypropylene, a polyethylene, an epoxy, a poly(ethylene terephthalate), a poly(methyl methacrylate), a polyurethane, a polystyrene, or a poly(vinyl ester).

The plastic copper nanowire compositions can be made by solution or melts processes.

In one embodiment, the invention provides a process for the preparation of a plastic copper nanowire composition comprising:

(a) adding a first solution of an alkylamine (e.g. excess alkylamine, such as 4.0 mol alkylamine/mol CuNW) and either (a) a copper nanowire composition comprising a copper nanowire having associated alkylamine ligands, or (b) a copper nanowire composition comprising a copper nanowire having associated alkylthiol ligands, in a first solvent to a second solution of a plastic in a second solvent to provide a reaction mixture;

(b) after a pre-determined period of time, adding a third solvent to the reaction mixture to precipitate the plastic copper nanowire composition from the reaction mixture; and (c) isolating the plastic copper nanowire composition from the reaction mixture.

In yet another embodiment, a representative solution-based process is described.

In another embodiment, the invention provides a process for the preparation of a plastic copper nanowire composition comprising:

(a) combining a plastic with either (a) a copper nanowire composition comprising a copper nanowire having associated alkylamine ligands, or (b) a copper nanowire composition comprising a copper nanowire having associated alkylthiol ligands;

(b) mixing the combination of the copper nanowire composition and the plastic at a temperature and for a time sufficient to disperse the copper nanowire composition substantially uniformly throughout the plastic to provide a mixed combination; and (c) cooling the mixed combination to provide the plastic copper nanowire composition.

DETAILED DESCRIPTION

The present invention provides a copper nanowire composition and the use of the composition as a property modifier for plastics.

The composition of the present invention is a copper nanowire that is stabilized with an aliphatic amine which binds to the surface. The surface-bound amine protects the copper from oxidation and also allows the nanowires to be mixed into plastics without aggregation (using, for example, melt or solution processing). The amine group is useful for stabilizing the copper, while the primary role of the aliphatic chain is to reduce aggregation and aid in mixing with plastics without aggregation.

Once the copper nanowires are prepared, it is critical that "excess" amine be added, otherwise the nanowires do not have adequate protection against oxidation during processing. "Excess" amine is defined as at least 5 wt % vs the weight of nanowire. Preferable amounts of "excess" amine are in the range of 100 wt % to 10,000 wt %. The use of "excess" amine assures copper nanowires with "surface attached" alkylamine.

The stabilized copper nanowires of the invention can be mixed with thermoplastics and thermoset plastics to substantially increase their thermal conductivity. For example, addition of 1.6 volume percent of copper nanowires stabilized with n-hexadecylamine into polypropylene more than triple the thermal conductivity (from 0.228 to 0.780 W/(m·° K)). This mixing process can be performed with solvents or alternatively using a melt-mixing process. The solution process involves adding the copper nanowires to a solution of the polymer. In the melt process the polymer is heated above the melting temperature before mixing.

The copper nanowire composition of the invention is prepared from copper nanowires and aliphatic amines. Suitable copper nanowires useful for making the composition are composed predominantly of copper metal with diameters less than 100 nm and lengths of at least 1000 nm. The aspect ratio of these wires (length divided by diameter) is at least 10. Suitable aliphatic amines useful for making the composition include primary ($R^1NH_2$) and secondary ($R^1R^2NH$) amines, where $R^1$ and $R^2$ are aliphatic groups, such as methyl, ethyl, n-propyl, i-propyl, butyl, i-butyl, sec-butyl, t-butyl, n-hexyl, cyclohexyl, n-octyl, n-decyl, n-hexadecyl, n-octadecyl, and related hydrocarbons. The aliphatic groups may contain aromatic substituents with the proviso that the carbon attached to the amine is saturated. Examples of such aliphatic groups are benzyl, 2-phenyl-1-ethyl, and 1-phenyl-1-ethyl.

The copper nanowire composition further includes a plastic. Suitable plastics include polyolefins, such as polyethylene variants (high density, low density, linear low density), polypropylene, copolymers of ethylene with propylene, vinyl acetate), ABS (terpolymer of acrylonitrile, butadiene, styrene), polystyrene, polyvinylchloride, polyesters such as poly(ethylene terephthalate), polycarbonates such as bisphenol A polycarbonate, nylons, and polyurethanes. Suitable plastics may also include thermosets, such as epoxy and vinyl esters.

This plastic/copper nanowire composition may be fabricated using conventional methods such as extrusion, injection molding, blow molding, vacuum forming, casting, coating, fiber spinning (both melt and solution), and compression molding. Articles such as films, coatings, composites (for example with glass fiber), molded articles, fibers, and laminates. The plastic/copper nanowire composition may also be used as an adhesive.

The preparation of representative copper nanowire compositions is described in Examples 1-5.

The following examples are for the purpose of illustrating, not limiting, the invention.

EXAMPLES

Example 1

Preparation of Copper Nanowires with Associated n-Hexadecylamine

In this example, the preparation of representative CuNWs with associated alkylamine is described.

In a typical CuNW synthesis procedure, copper chloride (298.5 mg, Alfa Aesar), n-hexadecylamine (2814.2 mg, TCI America) and glucose (396.0 mg, TCI America) were dissolved in 60 mL deionized water. The solution was vigorously stirred at room temperature in a 100 mL autoclave bottle for 8 hours until the solution became a homogenous blue emulsion. The mixture was kept at 110° C. without stirring for 16 hours. The color of the mixture turned to foxy red. The product was collected and washed with deionized water, hexane, ethanol, and xylene thoroughly with centrifugation-redispersion cycles. The final product was redispersed in xylene. A portion of CuNW solution in xylene (1 g) was placed in an aluminum pan and dried in a vacuum oven to determine the concentration of CuNW. The concentration of CuNW/xylene was controlled to be 7 mg/mL of CuNW in xylene. The product, CuNW with associated n-hexadecylamine, was stored in xylene under nitrogen protection. X-ray diffraction (XRD) pattern of as-prepared CuNWs exhibited strong diffraction of Cu (111) and Cu (200) facet at $2\theta=43.3°$ and $50.4°$. In addition, the intensity of Cu (111) was significantly higher than Cu (222), indicating the high quality of as-prepared CuNWs. The diameter and the length of CuNWs were estimated by Image J software based on 100 CuNWs. The diameter was 36.9±15.5 nm, and the length was 52.6±24.2 µm.

Example 2

CuNW Oxidation Protection by an Addition Alkylamine in Organic Solvent

A portion of the CuNW solution (1.5 mL) from Example 1 was centrifuged and redispersed in xylene (5 mL) in a 25 mL vial with or without an addition of n-hexadecylamine (150 mg, CuNW:n-hexadecylamine=1/15 w/w). Two vials were stirred for one hour and then placed into a 135° C.-oil bath for 20 min under air. XRD results showed strong oxidation of CuNW without the excess of n-hexadecylamine dissolved in the solution. The CuNW severely aggregated and located on the bottom of vial. On the other hand, with the excess of n-hexadecylamine in the solution, CuNW remained good dispersion in xylene with less oxidation.

Example 3

The Preparation of Polypropylene/CuNW with Associated n-Hexadecylamine

To prepare PP/CuNW-HDA composite with 3.0 vol % CuNW, a solution mixing method was employed. A portion of the CuNW/xylene solution (18.3 mL) from Example 1 was centrifuged and then redispersed in 30 mL xylene. An addition of n-hexadecylamine (1920 mg, CuNW:n-hexadecylamine=1/15 w/w) was added into CuNW/xylene solution. The mixture was then stirred under nitrogen for 1 hour until hecadecylamine was completely dissolved. Polypropylene (400 mg, YUNGSOX 1020, Formosa Plastics, Taiwan) was dissolved in 100 mL xylene with a magnetic stirrer at 135° C. for an hour. The CuNW/HDA solution was heated at 135° C. with nitrogen bubbling into solution. A glass pipet was used to transfer the hot CuNW/HDA solution into the PP solution with stirring. Afterward, ethanol was added to precipitate the PP/CuNW from the solution. The precipitate was collected by a filter paper (pore size: 25 µm) with a vacuum filtration system and then washed with hexane and ethanol for several times. The precipitate was collected and dried under a vacuum oven overnight at room temperature. The dried composite product was hot pressed at 175° C. under nitrogen atmosphere. The PP/CuNW composites were annealed at 120° C. for 2 hours under nitrogen atmosphere before characterization. Optical micrographs confirm the reasonable dispersion of CuNW in PP. Introducing 3.0 vol. % of CuNW into PP significantly increases the storage modulus and thermal conductivity, and slightly decreases the melting temperature and glass transition temperature. Storge modulus increases over 40% compared to neat PP at the room temperature and over 80% at elevated temperature of 75° C. The in-plane and through-plane thermal conductivities of PP significantly increase to 1.04 W/(m K) and 0.50 W/(m K), which are five-fold and 2-fold that of the neat PP, respectively. No detectable change in crystallinity was observed. The glass transition temperature slightly decreased from 3.9° C. to 1.8° C.

Example 4

The Preparation of Electrically Conductive PP/CuNW Composite

To prepare an electrically conductive PP composite containing 2.6 vol % CuNW, a solution mixing method was applied. A portion of CuNW-HDA solution (14.9 mL) from Example 1 was centrifuged and then redispersed in 25 mL xylene. Additional hexadecylamine (1564 mg) was added into the mixture and stirred at room temperature under $N_2$ protection for 1 hour. Polypropylene (400 mg, YUNGSOX 1020, Formosa Plastics, Taiwan) was dissolved in 100 mL xylene with a magnetic stirrer at 135° C. for an hour. The CuNW-HDA mixture was heated at 135° C. with nitrogen bubbling into solution. A glass pipet was used to transfer the hot CuNW-HDA solution into the PP solution with stirring. Afterward, ethanol was added to precipitate the PP/CuNW from the solution. A 0.05 M sodium borohydride (Sigma-Aldrich) in ethanol/deionized water (=1/1 (v/v)) was prepared. The precipitate was washed hexane, ethanol and then 40 mL 0.05 M sodium borohydride solution in a vacuum filtration setup. The product was washed with hexane and ethanol for several times, and then dried in a vacuum oven overnight. The dried sample was hot pressed under $N_2$ protection at 175° C. The 0.2 mm thin film was obtained for electrical conductivity measurement. The PP/CuNW composites were annealed at 120° C. for 2 hours before the thermal and electrical conductivity analyses. Incorporation of 2.6 vol % CuNW into PP after the treatment of 0.05 M sodium borohydride solution exhibits a significant increase in electrical conductivity and thermal conductivity. The electrical conductivity is increased by 16 orders of magnitude from $1.0 \times 10^{-14}$ S/cm to 380.8 S/cm. The thermal conductivity of PP increases 3 times from 0.23 W/(m K) to 0.78 W/(m K).

Example 5

The Preparation of Electrically Conductive Polypropylene/CuNW with 1-Dodecanethiol Protection A solution mixing method was used to prepare a PP composite containing 2.6 vol % CuNW with improved electrically conductivity and oxidation resistance. A portion of CuNW-HDA solution (14.9 mL) from example 1 was centrifuged and then redispersed in 25 mL xylene. Additional n-hexadecylamine (1564 mg) was added into the mixture and stirred at room temperature under $N_2$ protection for 1 hour. Polypropylene (400 mg, YUNGSOX 1020, Formosa Plastics, Taiwan) was dissolved in 100 mL xylene with a magnetic stirrer at 135° C. for an hour. The CuNW-HDA mixture was heated at 135° C. with nitrogen bubbling into solution. A glass pipet was used to transfer the hot CuNW-HDA solution into the PP solution with stirring. Afterward, ethanol was added to precipitate the PP/CuNW from the solution. A 0.05 M sodium borohydride (Sigma-Aldrich) in ethanol/deionized water (=1/1 (v/v)) was prepared. In addition, 4 g 1-dodecanethiol (Alfa Aesar) was dissolved in 40 mL ethanol. The precipitate was washed with hexane, ethanol, 40 mL 0.05 M sodium borohydride solution, and 40 mL 1-Dodecanethiol solution. The product was washed with hexane and ethanol after adding sodium borohydride solution and 1-Dodecanethiol solution. The final product was collected and then dried in a vacuum oven overnight. The dried sample was hot pressed at 175° C. under $N_2$ protection. Incorporation of 2.6 vol % CuNW into PP after the treatment of 0.05 M sodium borohydride solution and 0.5 M 1-Dodecanethiol solution significantly increases electrical conductivity and thermal conductivity of PP. The electrical conductivity significantly increases by 16 orders of magnitude from $1.0 \times 10^{-14}$ S/cm to 187.7 S/cm. The thermal conductivity of PP is increased 2.7 times from 0.23 W/(m K) to 0.62 W/(m K). With 1-dodecanethiol decorated on the CuNW surface, the oxidation of CuNW after hot processing is minimized. The intensity of $Cu_2O$ at $2\theta=36.2°$ in PP/CuNW with the treatment of 1-dodecanethiol is much lower than the PP composites from Example 3 and Example 4.

While illustrative embodiments have been illustrated and described, it will be appreciated that various changes can be made therein without departing from the spirit and scope of the invention.

What is claimed is:

1. A plastic copper nanowire composition, comprising:
a plastic, wherein the plastic is polyethylene, polypropylene, a copolymer of ethylene with propylene or vinyl acetate, a terpolymer of acrylonitrile, butadiene, and styrene, polyvinylchloride, poly(methyl methacrylate), polycarbonate, nylon, polyurethane, epoxy, poly(ethylene terephthalate), or poly(vinyl ester); and
copper nanowires having an associated ligand with a structure $HNR^1R^2$, wherein $R^1$ is hydrogen or an alkyl group, $R^2$ is an arylalkyl group, and the copper nanowires having the associated ligand are dispersed uniformly throughout the plastic.

2. The plastic copper nanowire composition of claim 1, wherein the copper nanowires have an aspect ratio of at least 10.

3. The plastic copper nanowire composition of claim 1, wherein the associated ligand is $HNR^1R^2$ that contains at least 12 carbon atoms.

4. The plastic copper nanowire composition of claim 1, wherein a weight of the associated ligand versus the weight of the copper nanowires is in a range of 100% to 10000%.

5. The plastic copper nanowire composition of claim 1, wherein $R^2$ is an aryl-substituted methylene group or an alkaryl-substituted methylene group.

6. The plastic copper nanowire composition of claim 1, wherein $R^2$ is a benzyl group, a 2-phenyl-1-ethyl group, or a 1-phenyl-1-ethyl group.

7. The plastic copper nanowire composition of claim 1, wherein $R^2$ is a 2-phenyl-1-ethyl group or a 1-phenyl-1-ethyl group.

8. The plastic copper nanowire composition of claim 1, wherein $R^1$ is selected from the group consisting of hydrogen, methyl, ethyl, n-propyl, i-propyl, n-butyl, sec-butyl, t-butyl, n-hexyl, cyclohexyl, n-octyl, n-decyl, n-hexadecyl, and n-octadecyl.

9. The plastic copper nanowire composition of claim 1, wherein $R^1$ is the alkyl group, and $R^2$ is the arylalkyl group.

10. The plastic copper nanowire composition of claim 9, wherein $R^1$ is selected from the group consisting of methyl, ethyl, n-propyl, i-propyl, n-butyl, sec-butyl, t-butyl, n-hexyl, cyclohexyl, n-octyl, n-decyl, n-hexadecyl, and n-octadecyl.

11. The plastic copper nanowire composition of claim 1, wherein $R^1$ is the alkyl group, and the alkyl group has 6 to 18 carbons atoms.

12. The plastic copper nanowire composition of claim 11, wherein the alkyl group has 12 to 18 carbons atoms.

13. The plastic copper nanowire composition of claim 1, wherein the plastic is a copolymer of ethylene with propylene or vinyl acetate, polyvinylchloride, nylon, or poly(vinyl ester).

14. A solvent-based process for preparation of the plastic copper nanowire composition of claim 1, comprising:
adding a first solution of an amine with the structure $HNR^1R^2$ and a copper nanowire composition comprising copper nanowires having the associated ligand with the structure $HNR^1R^2$ in a first solvent to a second solution of the plastic in a second solvent to provide a reaction mixture;
adding a third solvent to the reaction mixture to precipitate the plastic copper nanowire composition from the reaction mixture; and
isolating the plastic copper nanowire composition from the reaction mixture.

15. A melt process for preparation of the plastic copper nanowire composition of claim 1, the melt process comprising:
combining the plastic with a copper nanowire composition, wherein the copper nanowire composition comprises the copper nanowires having the associated ligand with the structure $HNR^1R^2$;
mixing the copper nanowire composition and the plastic at a temperature and for a time sufficient to disperse the copper nanowire composition uniformly throughout the plastic to provide a mixed combination; and cooling the mixed combination to provide the plastic copper nanowire composition.

* * * * *